(12) United States Patent
Iwashita et al.

(10) Patent No.: US 10,837,978 B2
(45) Date of Patent: Nov. 17, 2020

(54) METHOD FOR REMOVING LIQUID, AND LIQUID OPERATION DEVICE

(71) Applicant: KONICA MINOLTA, INC., Chiyoda-ku (JP)

(72) Inventors: Atsuo Iwashita, Tokyo (JP); Youichi Aoki, Saitama (JP); Koji Miyazaki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 219 days.

(21) Appl. No.: 15/773,502

(22) PCT Filed: Nov. 2, 2016

(86) PCT No.: PCT/JP2016/082587
§ 371 (c)(1),
(2) Date: May 3, 2018

(87) PCT Pub. No.: WO2017/082135
PCT Pub. Date: May 18, 2017

(65) Prior Publication Data
US 2018/0321270 A1 Nov. 8, 2018

(30) Foreign Application Priority Data
Nov. 9, 2015 (JP) ................................. 2015-219492

(51) Int. Cl.
*G01N 35/10* (2006.01)
*G01N 37/00* (2006.01)
(Continued)

(52) U.S. Cl.
CPC ..... *G01N 35/1004* (2013.01); *G01N 35/1009* (2013.01); *G01N 35/1016* (2013.01);
(Continued)

(58) Field of Classification Search
CPC . G01N 2035/00237; G01N 2035/0437; G01N 2035/1034; G01N 35/1004; G01N 35/1009; G01N 35/1016; G01N 37/00
See application file for complete search history.

(56) References Cited

U.S. PATENT DOCUMENTS

| | | | |
|---|---|---|---|
| 2007/0252866 A1* | 11/2007 | Kudo | B41J 2/16532 347/30 |
| 2012/0024048 A1* | 2/2012 | Maeda | G01N 30/20 73/61.55 |

(Continued)

FOREIGN PATENT DOCUMENTS

| | | |
|---|---|---|
| JP | 2003-262189 | 9/2003 |
| JP | 2012-159358 | 8/2012 |

(Continued)

OTHER PUBLICATIONS

Reasons for Rejection dated Sep. 27, 2019, issued in Japanese Patent Application No. 2017-550281.
(Continued)

*Primary Examiner* — Jennifer Wecker
(74) *Attorney, Agent, or Firm* — Cozen O'Connor (57) ABSTRACT

The present invention provides a method for removing liquid from the interior of a flow channel tip, which enables both to reduce the amount of liquid remaining and prevent the time spent removing the liquid from being longer than necessary. The method comprises: suctioning a liquid within a flow channel, the liquid being suctioned into the interior of a liquid suction implement inserted into a first through-hole of a flow channel tip; and removing the liquid within the flow channel. This method comprises: a first suction step for suctioning some of the liquid within the flow channel at a first suction speed; and a second suction step for suctioning the liquid remaining within the flow channel at a second
(Continued)

suction speed that is less than the first suction speed, the second suction step being performed in continuation from the first suction step.

6 Claims, 9 Drawing Sheets

(51) Int. Cl.
*G01N 35/00* (2006.01)
*G01N 35/04* (2006.01)

(52) U.S. Cl.
CPC ... *G01N 37/00* (2013.01); *G01N 2035/00237* (2013.01); *G01N 2035/0437* (2013.01); *G01N 2035/1034* (2013.01)

(56) References Cited

U.S. PATENT DOCUMENTS

2013/0183209 A1* 7/2013 Richter ............. A61M 5/16804
422/403
2013/0312546 A1* 11/2013 Wada ...................... B01L 3/021
73/864.11

FOREIGN PATENT DOCUMENTS

| JP | 2013-024605 | | 2/2013 |
| JP | 2013024605 A | * | 2/2013 |
| JP | 2013-185967 | | 9/2013 |
| JP | 2013185967 A | * | 9/2013 |
| JP | 2015-059898 | | 3/2015 |

OTHER PUBLICATIONS

International Preliminary Report on Patentability and Written Opinion dated May 24, 2018 issued in International Patent Application No. PCT/JP2016/082587.

Extended Search Report dated Nov. 6, 2018 issued in European Patent Application No. 16864098.5.

* cited by examiner

METHOD FOR REMOVING LIQUID, AND LIQUID OPERATION DEVICE

RELATED APPLICATIONS

This is a U.S. National Phase Application under 35 USC 371 of International Application PCT/JP2016/082587 filed on Nov. 2, 2016.

This application claims the priority of Japanese application no. 2015-219492 filed Nov. 9, 2015, the entire content of which is hereby incorporated by reference.

TECHNICAL FIELD

The present invention relates to a method for removing a liquid in a channel of a channel chip by suction, and a liquid-manipulating apparatus for implementing the method.

BACKGROUND ART

Known is a technique using a small chip provided with a channel (hereinafter, also simply referred to as "channel chip") to allow a liquid to move in the channel for reaction between substances contained in the liquid, separation of a substance from the liquid, detection of a substance contained in the liquid, or mixing of liquids (hereinafter, also referred to as simply "reaction or the like"). The channel chip includes a channel as a place for the reaction or the like, and a plurality of through-holes each allowing the channel to communicate with the outside of the channel. The channel chip enables reaction or the like in a simple and quick manner, and thus is under active development in recent years.

A liquid for reaction or the like is introduced into the channel via a through-hole for introduction of a liquid (hereinafter, also simply referred to as "inlet"). The liquid in the channel during or after the completion of reaction or the like is suctioned and removed by a liquid suction instrument via a through-hole for discharge of a liquid (hereinafter, also simply referred to as "outlet"). The liquid in the channel is removed with a pipette inserted into the outlet through suction into a nozzle communicating with the pipette.

Then, it is difficult to completely remove the liquid in the channel, and some of the liquid may be left unremoved in the channel (hereinafter, a liquid left unremoved is also simply referred to as "residual liquid"). If a liquid subsequently introduced into the channel is contaminated with the residual liquid, the liquid introduced is diluted or unnecessary reaction or the like proceeds, which may deteriorate the reliability of the outcome of reaction or the like. For this reason, a reduction in the amount of a residual liquid is required in liquid removal.

When the reaction or the like is immunoassay such as ELISA, a labeled solution containing a fluorescence-labeled secondary antibody, a washing solution or the like to remove an unreacted primary antibody or secondary antibody, and so on are required to be sufficiently removed from the channel, inlet, and outlet of the channel chip before introduction of another liquid from the inlet into the channel in the next step. When one channel chip is repeatedly used, it is required to sufficiently remove a liquid used for previous reaction or the like and a washing solution introduced into the channel after the completion of previous reaction or the like from the channel, inlet, and outlet before initiation of the subsequent reaction or the like.

PTL 1 describes a method for reducing the amount of a residual liquid in the channel, wherein the position of the tip of a pipette that suctions a liquid in the channel is brought closer to the bottom of the channel. In the method according to PTL 1, the liquid in the vicinity of the tip of the pipette is suctioned in a more reliable manner, and thereby the amount of a residual liquid in the vicinity of the tip of the pipette can be reduced.

CITATION LIST

Patent Literature

PTL 1
Japanese Patent Application Laid-Open No. 2013-185967

SUMMARY OF INVENTION

Technical Problem

The method according to PTL 1 can reduce the amount of a residual liquid in the vicinity of the tip of the pipette. However, a residual liquid can be generated not only in the vicinity of the outlet from which a pipette is inserted but also in an area away from the outlet of the channel. When a liquid in the channel is suctioned, for example, the liquid is partially divided and a fragment thereof attaches to the wall surface of the channel to remain as a residual liquid in the channel. It is desired for a reduction in the amount of a residual liquid in the channel of the channel chip to lower the likelihood of generation of a residual liquid in an area away from the outlet of the channel.

Dividing of a liquid in the channel is likely to occur if the velocity of the liquid suctioned and moving in the channel is high. Hence, a residual liquid as a fragment of the liquid divided can be reduced through lowering the suction rate for the liquid into a liquid suction instrument.

If the suction rate for a liquid is lowered, however, a longer time is required for liquid removal in the channel, and inevitably a longer time is required for reaction or the like or washing. Hence, the advantage of the channel chip, namely, quickness in reaction or the like and washing may be lost.

Accordingly, it is desired to achieve a reduction in a residual liquid in the channel and avoidance of consuming an unnecessarily long time for liquid removal in combination when a liquid from the inside of a channel of a channel chip is removed.

In view of the above problems, an object of the present invention is to provide a method for removing a liquid from the inside of a channel of a channel chip, the method being capable of achieving a reduction in the amount of a residual liquid in the channel and avoidance of consuming an unnecessarily long time for liquid removal in combination. Another object of the present invention is to provide a liquid-manipulating apparatus allowing implementation of the method.

Solution to Problem

In order to solve the above problems, a method for removing a liquid in a channel of a channel chip includes a through-hole provided in a ceiling of the channel and communicating with the outside by suction with a liquid suction instrument inserted into the channel via the through-hole, the method including: first suctioning including suction of a part of the liquid in the channel into the liquid suction instrument at a first suction rate; and second suctioning including suction of a liquid remaining in the channel into the liquid suction instrument at a second suction rate lower than the first suction rate, after the first suctioning.

In order to solve the above problems, a liquid-manipulating apparatus according to an embodiment of the present invention includes: a chip holder that holds a channel chip including a through-hole provided in a ceiling of the channel and communicating with the outside; a suction instrument holder that holds a liquid suction instrument to be inserted into the through-hole of the channel chip held by the chip holder and suction the liquid in the channel; and a suction-regulating section that controls the suction rate for the liquid into the liquid suction instrument to a first suction rate and, sequentially after suction at the first suction rate, controls the suction rate for the liquid into the liquid suction instrument to a second suction rate lower than the first suction rate.

Advantageous Effects of Invention

The present invention provides a method for removing a liquid in a channel of a channel chip, the method being capable of reducing the amount of a residual liquid in the channel without consuming an unnecessarily long time for liquid removal, and a liquid-manipulating apparatus allowing implementation of the method.

DESCRIPTION OF EMBODIMENTS

Now, the configuration of a channel chip intended in the present invention, Embodiments of the method for removing a liquid according to the present invention, and a liquid-manipulating apparatus for implementation of the method according to the present invention will be described with reference to the accompanying drawings.

[Configuration of Channel Chip]

Figure 1A:
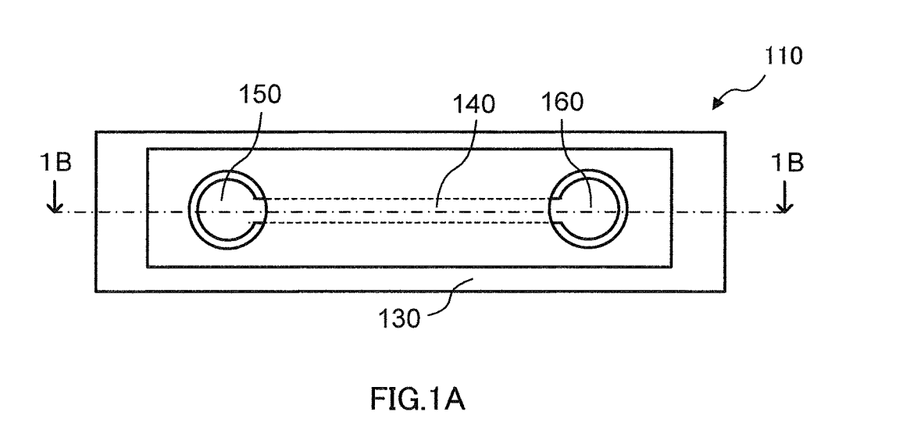
FIG. 1A is a plan view illustrating the configuration of one example of channel chips intended in the present invention.
Figure 1B:
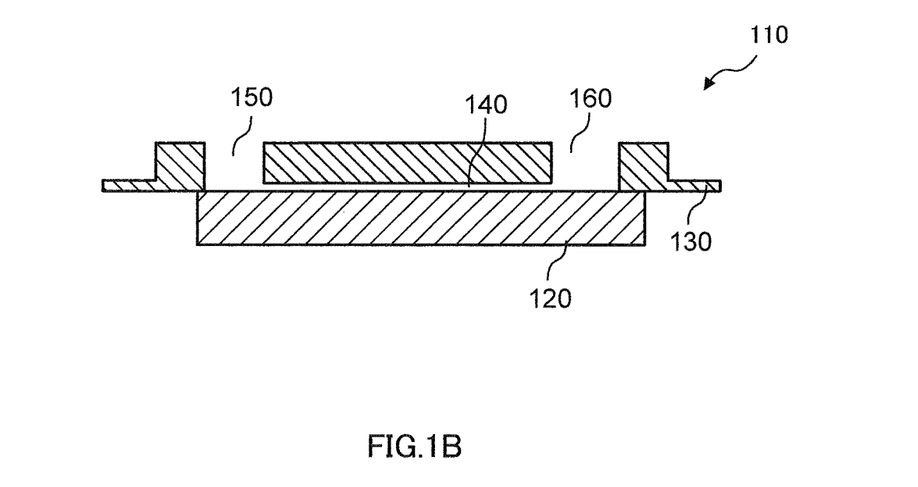
FIG. 1B is a cross-sectional view of the channel chip along line 1B-1B in FIG. 1A.

FIGS. 1A and 1B each illustrate channel chip 110, as one example of channel chips intended in the present invention. FIG. 1A is a plan view of channel chip 110, and FIG. 1B is a cross-sectional view of channel chip 110 along line 1B-1B in FIG. 1A.

As illustrated in FIG. 1B, channel chip 110 includes substrate 120 and channel lid 130. At least one (channel lid 130 in FIG. 1B) of substrate 120 and channel lid 130 includes a concave portion, and channel lid 130 includes through-holes (two through-holes, through-hole 150 and through-hole 160, in FIGS. 1A and 1B) in a region overlapping with the concave portion in the plan view. Channel chip 110 is produced through joining substrate 120 and channel lid 130 in such a manner that the surface including the concave portion formed therein is sandwiched between substrate 120 and channel lid 130. The concave portion corresponds to channel 140 and the plurality of through-holes correspond to through-hole 150 (first through-hole) and through-hole 160 (second through-hole) provided in a ceiling of the channel in channel chip 110. Channel 140 communicates with the outside of channel chip 110 via through-hole 150 and through-hole 160.

Figure 7:
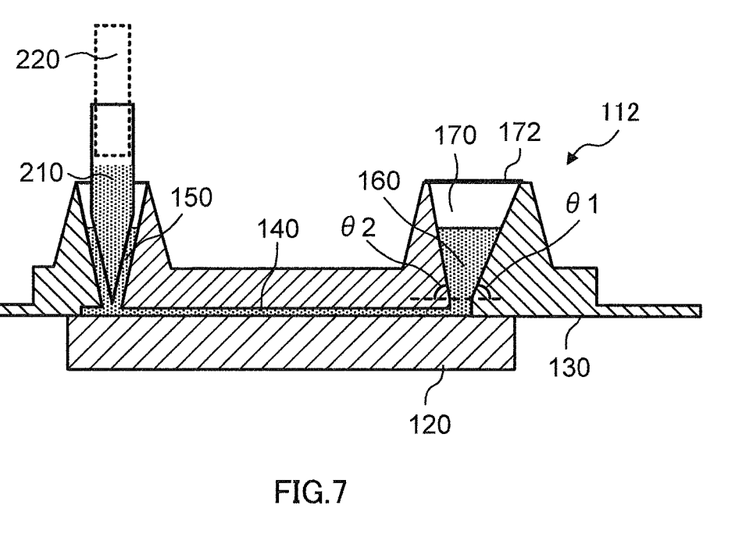
FIG. 7 is a cross-sectional view illustrating one example of modes of liquid removal in Embodiment 4.

Through-hole 150 and through-hole 160 can be used as an outlet and an inlet for a liquid. In this case, the liquid flows through channel 140 in one direction, from through-hole 160 as an inlet to through-hole 150 as an outlet. Alternatively, as illustrated in FIG. 7 to be described later, a configuration in which through-hole 150 is used as an inlet and an outlet for a liquid and liquid reservoir 170 is provided at the end of the channel in the side opposite to through-hole 150 to allow the liquid to reciprocally move through channel 140 may be used for higher manipulation efficiency for the liquid.

In any of the modes, a liquid suction instrument to be described later is inserted into through-hole 150. A liquid present in the inside of channel chip 110, specifically, a liquid present in channel 140, through-hole 150, and through-hole 160 or liquid reservoir 170 is removed through suction into the inside of the liquid suction instrument. The phrase "a liquid is removed" means that the total amount of a liquid present in channel 140, through-hole 150, and through-hole 160 or liquid reservoir 170 reaches equal to or smaller than the maximum value of the acceptable amount of a residual liquid which ensures the function of channel chip 110 (hereinafter, also simply referred to as "maximum acceptable amount of a residual liquid").

The shape, dimension, and depth of each of through-hole 150 and through-hole 160 can be arbitrarily determined in accordance with the type of a liquid to be used for reaction or the like and the purpose of the reaction. The shape, dimension, and depth of each of through-hole 150 and through-hole 160 in channel chip 110 can be arbitrarily set through changing the shape and dimension of each of the through-holes in designing channel lid 130. If the thickness of channel lid 130 in the vicinity of through-hole 150 or through-hole 160 is set larger, for example, through-hole 150 or through-hole 160 can be deeper. In FIG. 7 to be described later, through-hole 150 is set deeper to configure so that the position of the liquid surface in through-hole 150 can be higher from the bottom of channel 140, and this configuration allows storage of a larger volume of the liquid in liquid reservoir 170.

The shape, the length in the direction of liquid flow, and the cross-sectional area in any direction orthogonal to the direction of liquid flow (hereinafter, also simply referred to as "channel cross-sectional area") of channel 140 can be arbitrarily determined in accordance with the type and purpose of reaction or the like. To perform reaction or the like with smaller amounts of reagents, the maximum value of the channel cross-sectional area is preferably 5 mm$^2$ or smaller. Channel chip 110 including a channel in which the maximum value of the channel cross-sectional area is 5 mm$^2$ or smaller allows simpler and quicker reaction or the like. The shape of the channel is preferably such a shape that the channel extends in the horizontal direction.

Dividing of a liquid in channel 140 is particularly likely to occur if the channel cross-sectional area is small. The effect of contamination of a liquid introduced in a subsequent step with a liquid left unremoved in channel 140 on reaction or the like is particularly large when channel chip 110 including channel 140 with a small channel cross-sectional area. Hence, the advantageous effects of the present invention are more significantly exerted for a channel chip including channel 140 in which the maximum value of the channel cross-sectional area is 5 mm$^2$ or smaller. The maximum value of the channel cross-sectional area is more preferably 1 mm$^2$ or smaller and even more preferably 0.5 mm$^2$ or smaller for simpler and quicker reaction or the like.

The concept of channel 140 in which the maximum value of the channel cross-sectional area is 5 mm$^2$ or smaller includes a channel in which the maximum value of the distance between a wall surface constituting channel 140 and the wall surface opposite thereto in the direction orthogonal to the direction of liquid flow in channel 140 is 1 mm or smaller. Such a channel is also referred to as "microchannel". For the reason as described in the above, the advantageous effects of the present invention are more significantly exerted also for a channel device including a microchannel.

Figure 8:
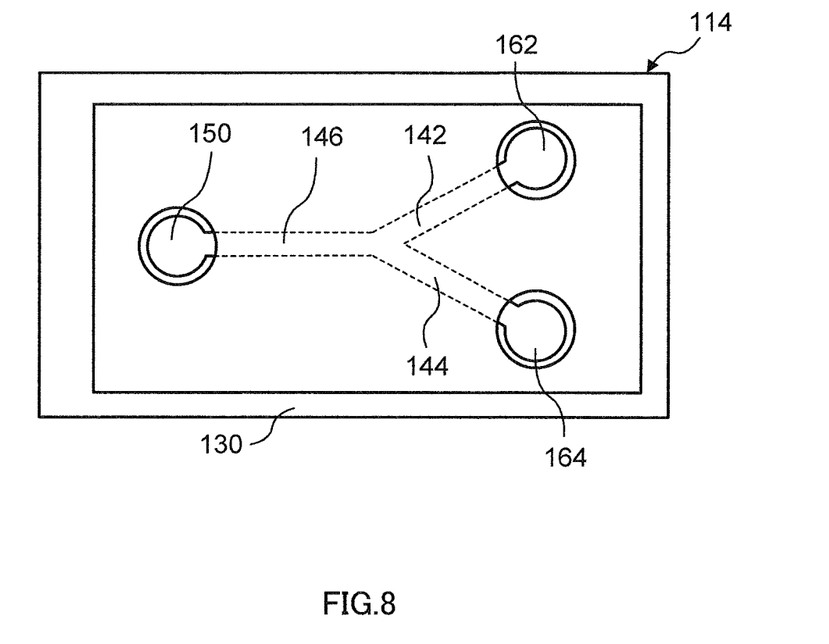
FIG. 8 is a plan view illustrating one example of channel chips from which liquid is removed in Embodiment 5.

Channel 140 may be provided singly in channel chip 110 as illustrated in FIGS. 1A and 1B, or a plurality of channels may be provided in channel chip 110 as illustrated in FIG. 8 to be described later. Channel 140 may have a gradient.

Substrate 120 and channel lid 130 may be made of any material which has such a size that the contact angle with a liquid does not inhibit the movement of the liquid and causes no unnecessary reaction with the liquid or a substance contained in the liquid. Such a material can be arbitrarily selected in accordance with the type or purpose of reaction or the like. The materials of substrate 120 and channel lid 130 are preferably a resin or a metal for easy shaping. When the inside of channel 140 is irradiated with light or when fluorescence or the like generated in channel 140 is measured outside of channel 140, it is preferred that at least one or both of substrate 120 and channel lid 130 be made of a material with a high light transmittance. Examples of the material with a high light transmittance include organic glass and silicate glass. When liquid is heated in channel 140 or it is desired to remove heat generated in reaction or the like, it is preferred that at least one of substrate 120 and channel lid 130 contain a material with a high thermal conductivity. Examples of the material with a high thermal conductivity include metals such as copper and aluminum.

Channel chip 110 may further include a component other than the above-described components, in accordance with the application. For example, channel chip 110 may include a binder that fixes a compound or the like to be used for reaction or the like or a metal film that generates surface plasmon resonance through irradiation with light in channel 140. Channel chip 110 may include a prism that allows the entrance of light outside of channel 140.

The liquid is a liquid to be subjected to reaction or the like in channel chip 110. Examples of the liquid include a solution in which a substance to be reacted is dissolved, a dispersion in which a substance to be reacted is dispersed, a specimen in which a substance to be separated or a substance to be detected is dissolved or dispersed, two or more different liquids to be mixed together, and other liquids to be used for reaction or the like. Examples of the specimen include blood, serum, plasma, urine, nasal mucus, saliva, and semen. Examples of the liquid to be used for reaction or the like include a labeled solution containing a fluorescence-labeled subject to be captured and a washing solution such as a buffer.

Channel chip 110 may be a one-time-use chip for one reaction or the like, or a reusable chip.

Liquid Removal

Embodiment 1

Embodiment 1 relates to a method for removing a liquid in the inside of channel chip 110 by suction of the liquid in the inside of channel chip 110 into the inside of a liquid suction instrument (pipette 210) inserted into through-hole 150.

Figure 2:
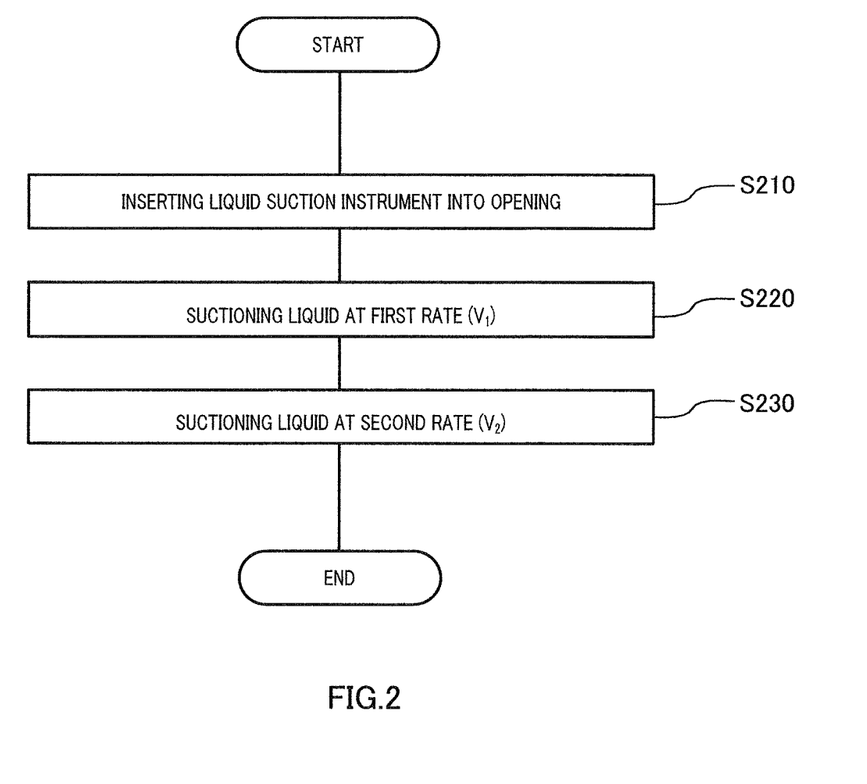
FIG. 2 is a flowchart for a method for removing a liquid in Embodiment 1.

FIG. 2 is a flowchart for the method for removing a liquid in Embodiment 1. The removal method according to the present embodiment includes suction of a liquid at a first rate (hereinafter, also simply represented as "$V_1$") (S220) and suction of a liquid performed sequentially thereafter at a second rate (hereinafter, also simply represented as "$V_2$") lower than $V_1$ (S230). The removal method according to the present embodiment may further include insertion of a liquid suction instrument (pipette 210) into through-hole 150 (S210).

Figure 3A:
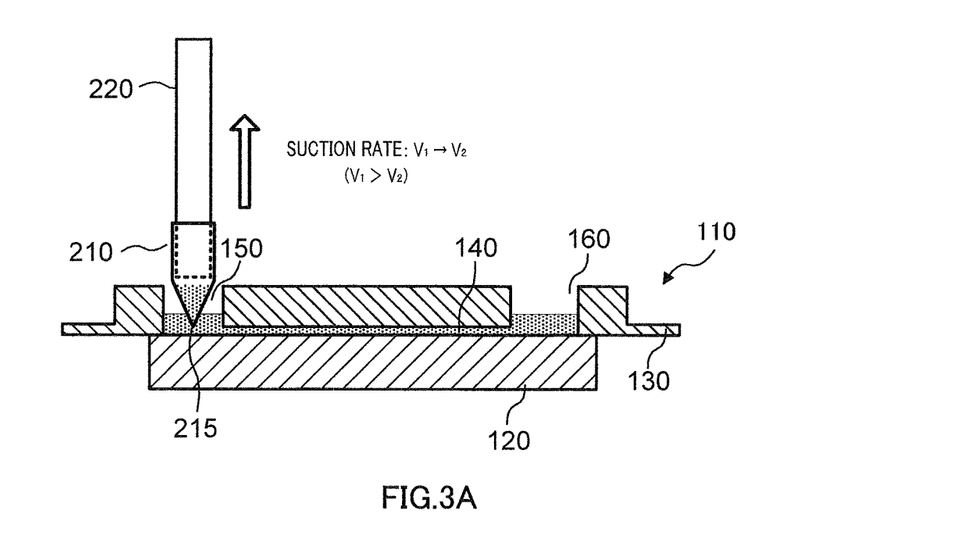
FIG. 3A is a cross-sectional view illustrating one example of modes of liquid removal in Embodiment 1.

FIG. 3A is a cross-sectional view illustrating one example of modes of liquid removal in Embodiment 1. In FIG. 3A, the liquid suction instrument includes, for example, pipette 210 and nozzle 220 communicating with pipette 210. Pipette 210 is inserted into through-hole 150. The phrase "the liquid suction instrument is inserted into through-hole 150" means that the suction port of the liquid suction instrument (suction port 215 of the pipette in FIG. 3A) is positioned in through-hole 150 or in the inside of a liquid in channel 140, which is present under through-hole 150.

In FIG. 3A, the liquid present in channel 140, through-hole 150, and through-hole 160 or liquid reservoir 170 to be described later is suctioned from suction port 215 of the pipette into the inside of nozzle 220 and removed. The suction is achieved through lowering of the inner air pressure of nozzle 220 communicating with pipette 210 below the atmospheric pressure applied from through-hole 160 or liquid reservoir 170 to the liquid, for example, under control by a suction-regulating section to be described later. In this case, the suction rate from pipette 210 can be adjusted through regulation of the inner air pressure of nozzle 220 under control by a suction-regulating section.

S220 is a step in which the liquid is suctioned into the liquid suction instrument (pipette 210) at a first suction rate ($V_1$). The suction rate can be calculated, for example, by dividing the volume of a liquid or gas to be suctioned into pipette 210 under control by a suction-regulating section by the suction time. When the inner air pressure of nozzle 220 is lowered as described above, the pressure-lowering rate corresponds to the suction rate.

In order to shorten the liquid removal time to avoid consuming an unnecessarily long time for reaction or the like, $V_1$ is preferably larger than a suction rate when the amount of a residual liquid in channel 140 reaches the maximum acceptable amount of a residual liquid after the liquid in channel 140 is suctioned at a constant suction rate into the inside of the liquid suction instrument (pipette 210) as much as possible (hereinafter, also simply referred to as "reference suction rate"). The maximum acceptable amount of a residual liquid is a value which can be determined in accordance with a system to be applied and intended performance, and can be set to, for example, 10% or less, preferably to 5% or less, even more preferably 1% or less, with respect the volume of channel 140. To determine the reference suction rate, for example, a liquid is removed from channel 140 at various suction rates to measure the amount of a residual liquid for each suction rate; if the amount of a residual liquid measured for a suction rate corresponds to the maximum acceptable amount of a residual liquid, then the suction rate is the reference suction rate.

S230 is a step in which the liquid is suctioned into the liquid suction instrument (pipette 210) at a second rate (hereinafter, also simply represented as "$V_2$") lower than the first suction rate. $V_2$ may be higher than the reference suction rate, or comparable to the reference suction rate, or lower than the reference suction rate. $V_2$ is preferably lower than the reference suction rate for further reduction of the amount of a residual liquid in the channel chip.

It is preferred to perform S230 sequentially after S220. The term "sequentially" means that a series of suction operations, from the initiation of removal of a particular liquid in channel 140 to the completion thereof, is performed in order and does not include any other step involving the movement of the liquid. As long as this requirement is satisfied, any step, for example, involving leaving the liquid at rest without any movement may be included between the two steps (in this case, S220 and S230).

The likelihood of dividing of the liquid in channel 140 becomes higher through intrusion of air from through-hole 160 or liquid reservoir 170 into channel 140 as the amount of a liquid in channel 140 decreases after the progression of liquid removal to some degree. Dividing of the liquid is likely to occur at a high suction rate, and less likely to occur at a low suction rate. For this reason, the liquid in channel 140 is suctioned at a higher suction rate ($V_1$) to shorten the removal time in initial stages of removal, in which dividing of the liquid is less likely to occur (S220), and the liquid in channel 140 is suctioned at a lower suction rate ($V_2$) to lower the likelihood of dividing of the liquid in later stages, in which the amount of the liquid is small (S230). Removal of the liquid in channel 140 in this order enables achievement of reduction of the amount of a residual liquid in channel 140 and avoidance of consuming an unnecessarily long time for liquid removal in combination.

It is preferred to avoid re-performing S220, in which dividing of the liquid is likely to occur, after S230, from the viewpoint of lowering the likelihood of generation of a residual liquid in channel 140. In addition, the frequency of changing the suction rate is preferably small from the viewpoint of easier implementation of the method according to the present embodiment. From these viewpoints, it is preferred to perform each of S220 and S230 once.

The time for suction of the liquid in S220, $T_1$, and the time for suction of the liquid in S230, $T_2$, can be arbitrarily set. It is preferred for achievement of the advantageous effects of the present invention in a more suitable manner to set $T_1$ and $T_2$ so that the whole of the liquid in channel chip 110 can be suctioned and liquid removal can be achieved in a period of time shorter than that required for liquid removal at the reference suction rate. Specifically, it is preferred to set $V_1$, $V_2$, $T_1$ and $T_2$ so that Equation 1 and Equation 2 below are both satisfied:

$$L_{all} < T_1 V_1 + T_2 V_2 \quad \text{Equation 1}$$

$$L_{all}/V_n > T_1 + T_2 \quad \text{Equation 2}$$

wherein $L_{all}$ (µL) denotes the total amount of the liquid present in the inside of channel 140, through-hole 150, and through-hole 160 or liquid reservoir 170 before the initiation of the first suctioning; $V_n$ (µL/sec) denotes the reference suction rate; $T_1$ (sec) denotes the time for suction in S220; and $T_2$ (sec) denotes the time for suction in S230. Here, $T_1 V_1 + T_2 V_2$ in Equation 1 represents the amount of a liquid which can be suctioned in the present embodiment; $L_{all}/V_n$ in Equation 2 represents the shortest time required for liquid removal at the reference suction rate; and $T_1 + T_2$ in Equation 2 represents the total period of time for suction in the present embodiment.

The total amount of the liquid, $L_{all}$, can be a value calculated, after removing the liquid from through-hole 150, channel 140, and through-hole 160 or liquid reservoir 170, by subtracting the total amount of the liquid discharged from the total amount of the liquid introduced.

When suction port 215 of the liquid suction instrument (pipette 210) is not inserted into through-hole 150, the present embodiment may further include, as S210, inserting the liquid suction instrument (pipette 210) into through-hole 150 to position suction port 215 of the liquid suction instrument (pipette 210) in the inside of the liquid in through-hole 150 or channel 140.

Figure 3B:
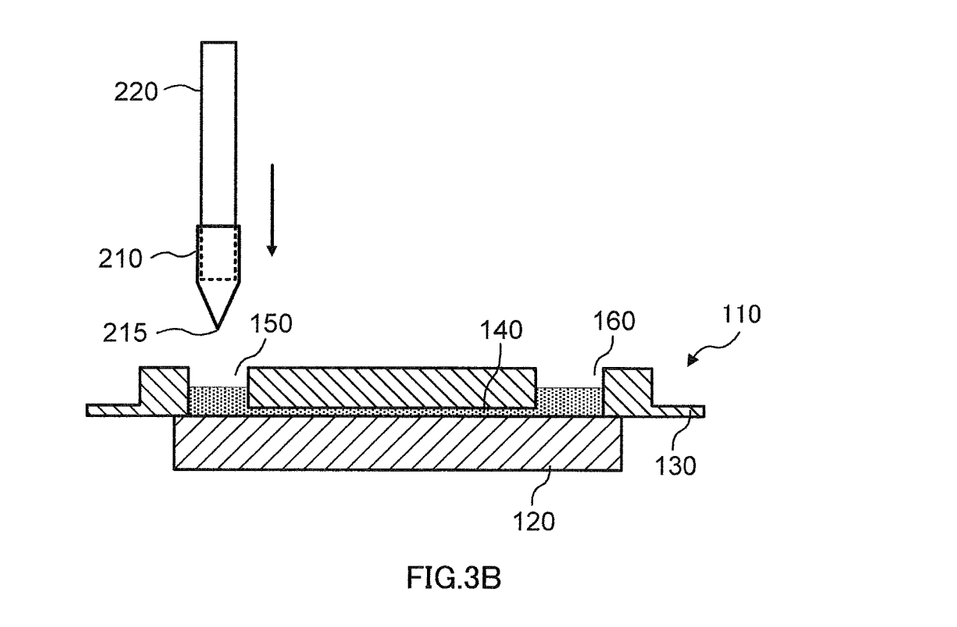
FIG. 3B is a cross-sectional view illustrating one example of modes of insertion of a liquid suction instrument into a through-hole in Embodiment 1.

S210 is a step in which the liquid suction instrument (pipette 210) is inserted into through-hole 150 to position suction port 215 of the liquid suction instrument (pipette 210) in the inside of the liquid in through-hole 150 or channel 140 of channel chip 110. In FIG. 3B, pipette 210 including suction port 215 and nozzle 220 are present above through-hole 150 in the vertical direction. Pipette 210 and nozzle 220 are configured in such a manner that they can move up and down in the vertical direction under control by a position-controlling section not illustrated. Pipette 210 moves down in the vertical direction under control by the pipette position-controlling unit, and is inserted into through-hole 150, preferably into a portion of channel 140 directly beneath through-hole 150. Thereby, suction port 215 of pipette 210 is positioned in the inside of the liquid in through-hole 150 or channel 140 to be ready for suction of the liquid.

Embodiment 2

Embodiment 2 relates to a method for removing a liquid in which suctioning at a first rate (S220) in Embodiment 1 is performed only when the surface of the liquid in through-hole 160 or liquid reservoir 170 is higher than ceiling 145 of channel 140. The other components are the same as those of Embodiment 1, and hence redundant descriptions will be omitted.

Figure 4A:
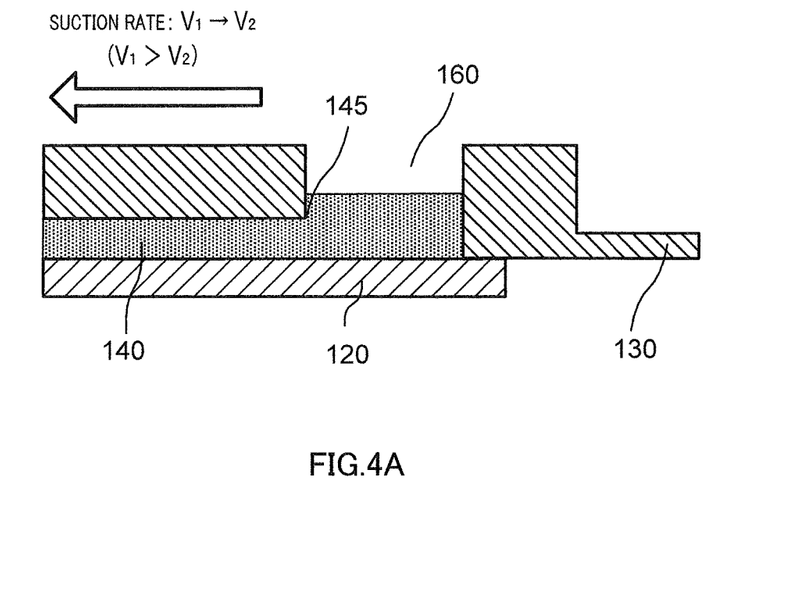
FIG. 4A is a cross-sectional view illustrating one example of modes of liquid removal in Embodiment 2.
Figure 4B:
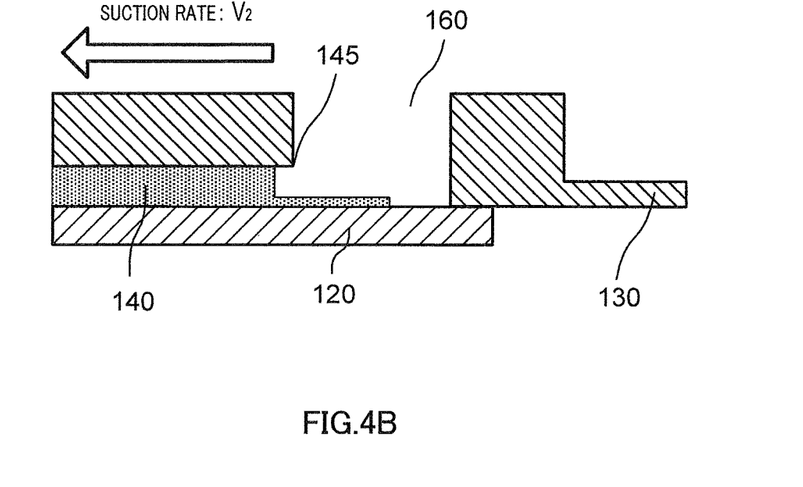
FIG. 4B is a cross-sectional view illustrating another example of modes of liquid removal in Embodiment 2.

FIGS. 4A and 4B are each a cross-sectional view illustrating one example of modes of liquid removal in Embodiment 2. In the present embodiment, suctioning at a first rate $V_1$ (S220) is performed only when the surface of the liquid is higher in the vertical direction than ceiling 145 of channel 140. In other words, any of suctioning at a first rate $V_1$ (S220) and suctioning at a second rate $V_2$ (S230) may be performed when the surface of the liquid is higher in the vertical direction than ceiling 145 of channel 140, and suctioning at a second rate $V_2$ (S230) is performed, without performing suctioning at a first rate $V_1$ (S220), when the surface of the liquid is lower in the vertical direction than ceiling 145. Specifically, the suction rate for the liquid is changed from $V_1$ (S220) to $V_2$ (S230) when the surface of the liquid in through-hole 160 or liquid reservoir 170 is higher in the vertical direction than ceiling 145 of channel 140.

Removal of the liquid in the present embodiment starts in a situation in which the liquid surface is higher in the vertical direction than ceiling 145, as illustrated in FIG. 4A. The liquid surface in through-hole 160 or liquid reservoir 170 descends as the liquid is suctioned and removed, and reaches the horizontal plane at the level of ceiling 145. When the liquid surface descends in the vertical direction below the horizontal plane at the level of ceiling 145, air intrudes into the upper part of channel 140 as illustrated in FIG. 4B, and the air causes a higher tendency of dividing of the liquid. In view of this, when the liquid surface is lower in the vertical direction than ceiling 145, the likelihood of dividing of the liquid can be lowered by suctioning the liquid at a lower suction rate (S230), as in the present embodiment, to lower the velocity of the liquid in channel 140.

When the channel has a gradient in the present embodiment, the surface of the liquid can be suitably determined with reference to a through-hole, not the through-hole as an outlet (through-hole 160 as an inlet in FIGS. 4A and 4B), or the edge of ceiling 145 of channel 140 in the liquid reservoir 170 side.

In the present embodiment, the suction rate for the liquid is increased (S220) to shorten the time required for removal of the liquid when the liquid surface is higher in the vertical direction than ceiling 145, and the suction rate for the liquid is decreased (S230) to lower the likelihood of generation of a residual liquid due to dividing of the liquid when the liquid surface is lower in the vertical direction than ceiling 145. These operations can further lower the likelihood of generation of a residual liquid in channel 140 without consuming an unnecessarily long time for liquid removal.

Embodiment 3

Embodiment 3 relates to a method for removing a liquid in channel 140 in which suction of the liquid at a second rate ($V_2$) (S230) in Embodiment 1 or Embodiment 2 is performed and sequentially thereafter suction of the liquid at a third rate ($V_3$) lower than the second rate (S240) is performed. The suctioning at a third rate (S240) is performed when the surface of the liquid is within channel 140. The other components are the same as those of Embodiment 1 or Embodiment 2, and hence redundant descriptions will be omitted.

Figure 5:
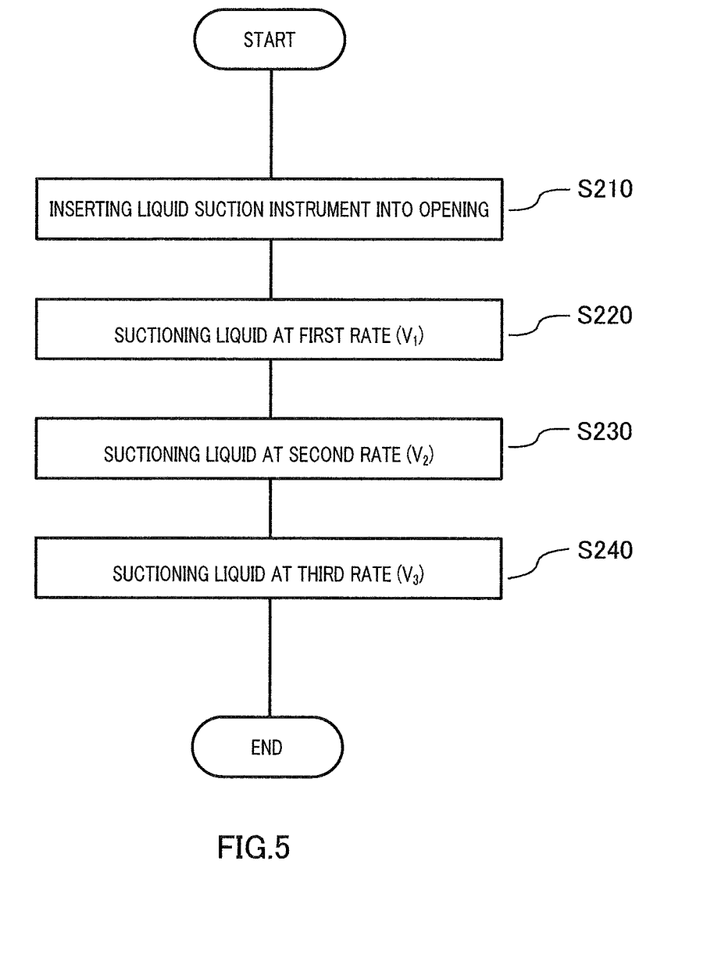
FIG. 5 is a flowchart for a method for removing a liquid in Embodiment 3.
Figure 6A:
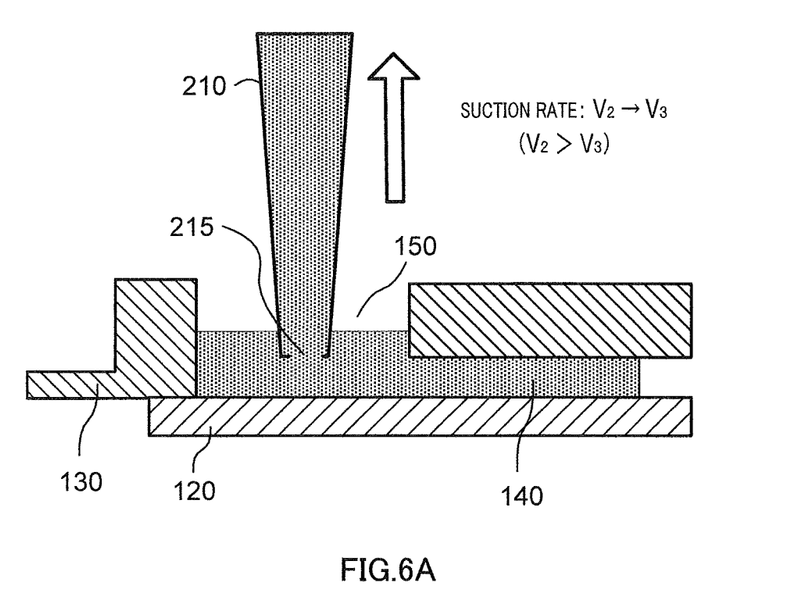
FIG. 6A is a cross-sectional view illustrating one example of modes of liquid removal in Embodiment 3.
Figure 6B:
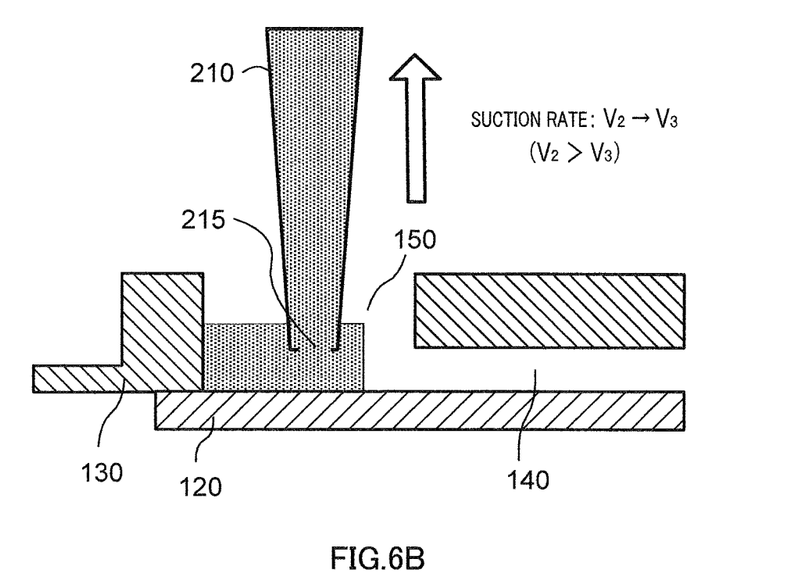
FIG. 6B is a cross-sectional view illustrating another example of modes of liquid removal in Embodiment 3.

FIG. 5 is a flowchart for a method for removing a liquid in Embodiment 3. FIGS. 6A and 6B are cross-sectional views illustrating different examples of modes of liquid removal in S240 added in the present embodiment.

S240 is a step in which the liquid is suctioned into the liquid suction instrument at a suction rate from pipette 210 of a third rate (hereinafter, also simply represented as "$V_3$") lower than the second rate. $V_3$ is only required to be lower than $V_2$. $V_3$ is preferably lower than the reference suction rate for further reduction of the amount of a residual liquid in channel 140.

As liquid removal proceeds and the amount of the liquid in channel 140 decreases, air which has intruded from through-hole 150 arrives at suction port 215 of pipette 210, and foaming of the liquid and collapse of bubbles tend to occur near suction port 215 of the pipette. If foaming and collapse of bubbles occur, the liquid in through-hole 150 and channel 140 is divided by the air, and tends to remain in through-hole 150 or channel 140 without being suctioned. If the suction rate from pipette 210 is further lowered as in the present embodiment, in contrast, foaming and collapse of bubbles are less likely to occur, and hence dividing of the liquid is less likely to occur and thus a residual liquid is less likely to be generated.

It is preferred for further reduction of the amount of a residual liquid to change the suction rate to $V_3$ when the surface of the liquid is within channel 140 as illustrated in FIG. 6A. The phrase "the surface of the liquid is within channel 140" means that the liquid contacting with suction port 215 of the pipette in through-hole 150 is extending into the inside of channel 140 without being divided and not extending into the inside of through-hole 160 or liquid reservoir 170 (see FIG. 6A). In this case, it is preferred for further shortening of the time required for liquid removal to change the suction rate when the amount of the liquid in channel 140 has reduced to ½ or less of the capacity of channel 140, more preferred is to change the suction rate when the amount of the liquid in channel 140 has reduced to ¼ or less of the capacity of channel 140, and even more preferred to change the suction rate when the amount of the liquid in channel 140 has reduced to ⅛ or less of the capacity of channel 140. The amount of the liquid in channel 140 (the fraction of the amount of a residual liquid to the volume of the channel) can be calculated by dividing the distance between the end of channel 140 in the through-hole 150 side and the tip of the extending liquid by the length of channel 140. The length of channel 140 refers to the distance between the edge of the channel in the through-hole 150 side and the edge of the channel in the through-hole 160 or liquid reservoir 170 side.

On the other hand, it is preferred for avoidance of consuming an unnecessarily long time for liquid removal to change the suction rate to $V_3$ when the surface of the liquid (the back edge of a residual liquid) is at a portion of channel 140 directly beneath through-hole 150 (see FIG. 6B).

Embodiment 4

Embodiment 4 relates to a method for removing a liquid in a channel chip including a liquid reservoir by using any method of Embodiment 1, Embodiment 2, and Embodiment 3.

FIG. 7 is a side view illustrating one example of modes of liquid removal in Embodiment 4. Liquid reservoir 170 is present at the end of channel chip 112 in the side opposite to through-hole 150. Liquid reservoir 170 is configured to allow exchange of air in channel chip 112 with external air. For example, liquid reservoir 170 may be opened to the outside of channel chip 112. To prevent the leakage of the liquid, the opening facing the outside of channel chip 112 may be provided with membrane 172 which does not allow liquid to transmit therethrough but allows air to transmit therethrough.

Although the shape of liquid reservoir 170 is not limited, the side surface of liquid reservoir 170 in a cross-section of the channel chip cut along the vertical direction is preferably inclined. In this case, each of the angles of the side surfaces of liquid reservoir 170 to the horizontal plane (θ1 and θ2 in FIG. 7) is preferably 30° or larger.

In the present embodiment, through-hole 150 functions as both an inlet and an outlet for the liquid. The liquid introduced from through-hole 150 as the inlet passes through channel 140 and is stored in liquid reservoir 170. Thereafter, the liquid moves from liquid reservoir 170 to channel 140, and again passes through channel 140, and is discharged from through-hole 150 as the outlet. The other components of channel chip 112 are the same as those of channel chip 110, and hence redundant descriptions will be omitted.

The movement of the liquid can be controlled by a suction-regulating section and a liquid suction instrument. When the liquid is allowed to move through channel 140 from through-hole 150 to the direction of liquid reservoir 170, for example, the suction-regulating section increases the inner pressure of nozzle 220 communicating with pipette 210 to a pressure larger than the atmospheric pressure, with pipette 210 inserted into through-hole 150. When the liquid is allowed to move through channel 140 from liquid reservoir 170 to the direction of through-hole 150, in contrast, the suction-regulating section decreases the inner pressure of nozzle 220 to a pressure lower than the atmospheric pressure.

After the liquid is allowed to reciprocate within channel 140 in a given cycles, any of Embodiment 1, Embodiment 2, and Embodiment 3 is performed, and thus the liquid can be removed from through-hole 150, channel 140, and liquid reservoir 170.

The present embodiment can enhance the efficiency of reaction or the like in a simple manner through allowing the liquid to repeatedly reciprocate within channel 140 for reaction or the like in the channel in multiple cycles.

The present embodiment allows introduction and moving of a liquid, and suction of a liquid at different suction rates in a simple manner. For example, introduction and moving of a liquid, and suction of a liquid at different suction rates can be performed simply by increasing or decreasing the inner pressure of nozzle 220 in FIG. 7. Hence, the present embodiment can achieve both enhancement of the efficiency of reaction or the like through reciprocating motion of a liquid in channel 140 and reduction of the amount of a residual liquid, without any complex apparatus configuration or any additional cost.

Also in the present embodiment, suctioning at a first rate (S220) may be performed only when the surface of the liquid in liquid reservoir 170 is higher than ceiling 145 of channel 140 (see Embodiment 2). In this case, the suction rate for the liquid may be changed from $V_1$ (S220) to $V_2$ (S230) when the surface of the liquid in liquid reservoir 170 is higher than ceiling 145 of channel 140, or the suction rate for the liquid may be changed from $V_1$ (S220) to $V_2$ (S230) when the surface of the liquid is within liquid reservoir 170.

Embodiment 5

Embodiment 5 relates to a method for removing a liquid in a channel chip including a plurality of channels joining together by using any method of Embodiment 1, Embodiment 2, and Embodiment 3.

FIG. 8 is a plan view illustrating one example of channel chips from which a liquid is removed in Embodiment 5. In the present embodiment, channel chip 114 includes through-hole 162 and through-hole 164 as inlets, and through-hole 150 as an outlet. Through-hole 162 communicates with channel 142, through-hole 164 communicates with channel 144, channel 142 and channel 144 both communicate with channel 146, and channel 146 communicates with through-hole 150. A first liquid introduced from through-hole 162 to flow through channel 142 and a second liquid introduced from through-hole 164 to flow through channel 144 are joined in channel 146 to be mixed together, and they are removed from through-hole 150 after the completion of necessary reaction or the like. The other components of channel chip 114 are the same as those of channel chip 110, and hence redundant descriptions will be omitted.

Embodiment 1, Embodiment 2, and Embodiment 3 are also applicable to channel chip 114 with such configuration. That is, liquid removal can be achieved in an even shorter period of time in accordance with any method of Embodiment 1, Embodiment 2, and Embodiment 3 with changing the suction rate from a pipette inserted into the liquid in through-hole 150, and the likelihood of generation of a residual liquid in channel 142, channel 144, and channel 146 can be further lowered.

Channel 142 and channel 144 may have different channel lengths. Liquid removal can be achieved even for channel chip 114 with such configuration in accordance with any method of Embodiment 1, Embodiment 2, and Embodiment 3. If Embodiment 2 is implemented in this case, it is preferred for lowering of the likelihood of dividing of the liquid due to introduction of air into the channel to change the suction rate for the liquid from $V_1$ (S220) to $V_2$ (S230) when the surface of the liquid in the shortest channel is higher in the vertical direction than ceiling 145 of the channel.

Channel 142 and channel 144 may have different channel gradients. Liquid removal can be achieved even for channel chip 114 with such configuration in accordance with any method of Embodiment 1, Embodiment 2, and Embodiment 3. If Embodiment 2 is implemented in this case, it is preferred for lowering of the likelihood of dividing of the liquid due to introduction of air into the channel to change the suction rate for the liquid from $V_1$ (S220) to $V_2$ (S230) when the surface of the liquid in a through-hole of through-hole 162 and through-hole 164 with the lower ceiling (upper end) at the opening of the channel is higher in the vertical direction than the ceiling (upper end) at the opening of the channel.

Although FIG. 8 illustrates a mode in which two channels, namely, channel 142 and channel 144, join together, the number of channels joining together in the present embodiment can be two or more. For example, channel chip 114 may include three, four, or more channels.

[Liquid-manipulating Apparatus]

The above-described method for removing a liquid can be implemented with a common liquid-manipulating apparatus allowing reaction or the like through introduction of a liquid into a channel chip and removal of the liquid therefrom.

Figure 9A:
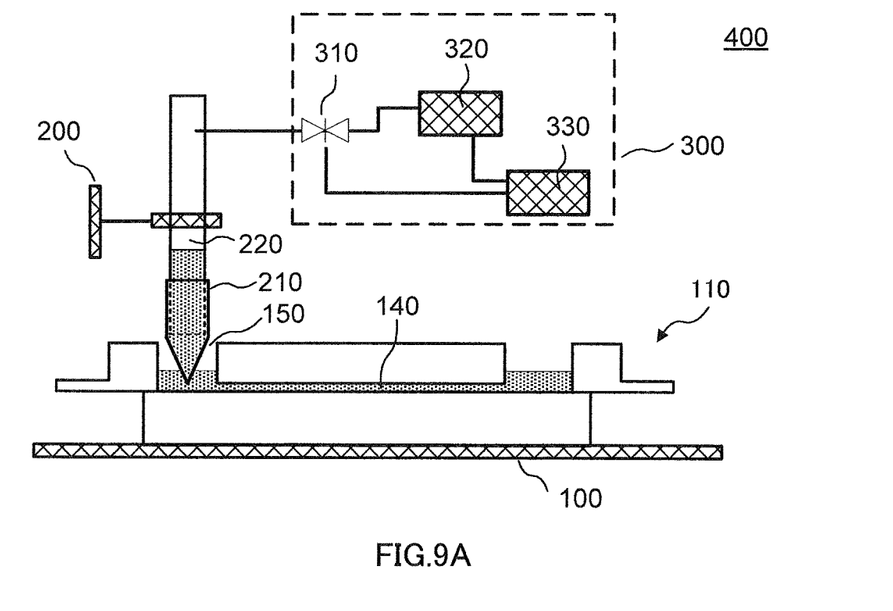
FIG. 9A is a schematic view illustrating an example of liquid-manipulating apparatuses according to the present invention.
Figure 9B:
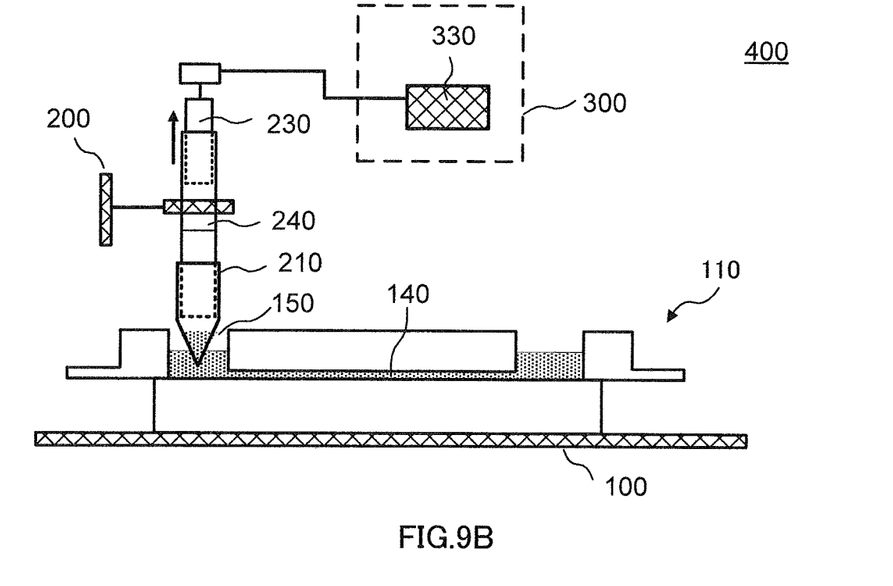
FIG. 9B is a schematic view illustrating another example of liquid-manipulating apparatuses according to the present invention.

FIGS. 9A and 9B are each a side view illustrating an example of liquid-manipulating apparatus 400 according to the present invention. Liquid-manipulating apparatus 400 includes chip holder 100 that holds channel chip 110, channel chip 112, or channel chip 114 each described above, suction instrument holder 200 that holds the liquid suction instrument described above, and suction-regulating section 300 that regulates the suction rate for the liquid into the liquid suction instrument.

Chip holder 100 is only required to be capable of holding channel chip 110. Chip holder 100 may be configured to be capable of moving channel chip 110, as necessary.

Suction instrument holder 200 is only required to be capable of holding the liquid suction instrument. Suction instrument holder 200 may be configured to be capable of moving the liquid suction instrument in the vertical direction or horizontal direction to insert the liquid suction instrument into the liquid in through-hole 150.

The liquid suction instrument is only required to be capable of suctioning the liquid. For example, the liquid suction instrument can be configured to include pipette 210 and nozzle 220, as illustrated in FIG. 9A. Pipette 210 has a shape allowing pipette 210 to be inserted into through-hole 150, and is capable of suctioning the liquid in through-hole 150 from suction port 215. Nozzle 220 is capable of temporarily storing the liquid suctioned by pipette 210. The liquid suction instrument can be configured to include pipette 210 and syringe 240 including plunger 230, as illustrated in FIG. 9B.

The liquid-manipulating apparatus may be configured integrally with the liquid suction instrument, or configured to be capable of holding and releasing the liquid suction instrument.

Suction-regulating section 300 is only required to be capable of suctioning the liquid into the inside of the liquid suction instrument at a desired suction rate. In FIGS. 9A and 9B, for example, suction-regulating section 300 is only required to be capable of reducing the inner air pressure of nozzle 220 to a given air pressure. When the inner air pressure of nozzle 220 is reduced to a certain degree, the liquid is suctioned from pipette 210 into nozzle 220 by the action of a pressure difference between the inner air pressure of nozzle 220 and the second air pressure applied to the liquid from through-hole 160 or liquid reservoir 170, and the liquid is removed from the inside of channel chip 110. Suction-regulating section 300 changes the inner air pressure of nozzle 220 so that suction of the liquid at a first rate ($V_1$), suction of the liquid at a second rate ($V_2$), and optional suction of the liquid at a third rate ($V_3$) are sequentially performed.

Suction-regulating section 300 can be configured to include pressure valve 310, decompression section 320, and controlling section 330 that controls pressure valve 310 and decompression section 320, as illustrated in FIG. 9A. Controlling section 330 orders decompression section 320 to discharge air in the inside of nozzle 220 to lower the inner air pressure of nozzle 220. Then, controlling section 330 controls pressure valve 310 to change the amount of discharge, and thereby regulates the reduction of the inner pressure of nozzle 220 to regulate the suction rate for the liquid from pipette 210. Examples of decompression section 320 include known vacuum pumps.

Suction-regulating section 300 may be configured to include syringe 240, plunger 230 connected to syringe 240, and controlling section 330 that controls the movement of plunger 230, as illustrated in FIG. 9B. Controlling section 330 orders plunger 230 to move to increase the inner volume of syringe 240, and thereby reduces the inner air pressure of syringe 240. Then, controlling section 330 changes the moving speed of plunger 230, and thereby regulates the reduction of the inner pressure of syringe 240 to regulate the suction rate for the liquid from pipette 210.

Suction-regulating section 300 may operate as an introduction-controlling section that introduces a liquid into the channel. In this case, the liquid suction instrument can serve as a liquid introduction instrument that introduces a liquid into channel chip 110. In FIG. 9A, for example, suction-regulating section 300 allows decompression section 320 to function as a pressurizing section to increase the inner pressure of nozzle 220 through introduction of air into the inside of nozzle 220, and thereby a liquid can be introduced from nozzle 220 through pipette 210 into channel 140. In FIG. 9B, suction-regulating section 300 orders plunger 230 to move for decrease of the inner volume of syringe 240 to increase the inner pressure of syringe 240, and thereby a liquid can be introduced into channel 140.

Suction-regulating section 300 may operate as a liquid level measurement section that measures the position of the liquid surface. For example, suction-regulating section 300 can determine the position of the liquid surface, where the capacity of through-hole 150, the capacity of channel 140, and the capacity of through-hole 160 or liquid reservoir 170 are sequentially subtracted from the amount of the liquid in channel chip 110, and when the resulting value reaches negative, the liquid surface is determined to be present in the corresponding position. Then, suction-regulating section 300 can determine the amount of the liquid in channel chip 110, for example, by subtracting the amount of a removed liquid, as the product of the suction rate and the suction time, from the amount of the liquid introduced into channel chip 110.

Suction-regulating section 300 can switch the suction rate for the liquid from a first rate ($V_1$) to a second rate ($V_2$) on the basis of the position of the liquid surface determined from operation as a liquid level measurement section, for example, only when the liquid surface is higher in the vertical direction than the ceiling of the channel Suction-regulating section 300 can switch the suction rate for the liquid from a second rate ($V_2$) to a third rate ($V_3$) when the position of the liquid surface is within the channel or after the liquid is removed from the channel. In addition, suction-regulating section 300 can appropriately switch the suction rate for the liquid in such a manner that the above-described method for removing a liquid can be implemented.

The liquid-manipulating apparatus may include an additional component according to intended reaction or the like. Examples of the additional component include a light irradiation section, a light detection section, a heating section, a temperature measurement section, and a position-controlling section that moves the position of the channel chip or the liquid suction instrument.

[Specific Examples of Liquid Removal]

Pipette 210 was inserted into through-hole 150 of channel chip 112 illustrated in FIG. 7, and in the state a liquid in channel 140 of channel chip 112 was removed through a plurality of steps of suctioning of the liquid in channel 140 into pipette 210 at different suction rates.

Channel 140 was a microchannel having a maximum width of 5 mm, a height of 0.1 mm, and a capacity of 10 μL. The materials of substrate 120 and channel lid 130 were each resin, and the surface of substrate 120 in contact with channel 140 included a film made of gold and formed thereon. Into channel 140, through-hole 150, and liquid reservoir 170 of channel chip 112, 150 μL of a liquid (a labeled solution containing fluorescence-labeled secondary antibodies) was introduced. A pipette chip (ART300, manufactured by Thermo Scientific) as a liquid suction instrument with a capacity of 300 μL was inserted into through-hole 150, and the inner pressure of a nozzle communicating with the pipette chip was decreased to suction the liquid by using a stepping pump (MS-SPVIII, manufactured by ITO CORPORATION). The suction rate in each step of suctioning was set as listed in Table 1, and the amount of suction and suction time in each step of suctioning were set as listed in Table 2. A plunger connected to nozzle 220 and not illustrated was moved to increase the inner volume of nozzle 220, and thereby the liquid was suctioned and removed from the inside of channel chip 112.

The maximum acceptable amount of a residual liquid in channel chip 112 was 2.0 μL.

TABLE 1

Suction rate

| | Rate (µL/sec) |
|---|---|
| First suctioning | 25 |
| Second suctioning | 8 |
| Third suctioning | 4 |
| For comparison | 8 |

TABLE 2

Amount of suction and suction time for liquid

| | Experiment 1 | | Experiment 2 | | Experiment 3 | |
|---|---|---|---|---|---|---|
| | Amount of suction (µL) | Suction time (sec) | Amount of suction (µL) | Suction time (sec) | Amount of suction (µL) | Suction time (sec) |
| First suctioning | 130 | 5.20 | 130 | 5.2 | — | — |
| Second suctioning | 70 | 8.75 | 18 | 2.25 | — | — |
| Third suctioning | — | — | 52 | 13.00 | — | — |
| For comparison | — | — | — | — | 200 | 25.00 |
| Total | 200 | 13.95 | 200 | 17.45 | 200 | 25.00 |
| Amount of residual liquid | 1.5 µL | | 1.0 µL | | 1.4 µL | |

Combination of the first suctioning at a suction rate higher than the reference suction rate and the second suctioning at a suction rate lower than that of the first suctioning (Experiment 1) successfully removed the liquid in a shorter period of time than liquid removal at a single rate which results in a residual liquid in an amount equal to or smaller than the maximum acceptable amount of a residual liquid (Experiment 3), and the amount of a residual liquid was almost comparable to that in Experiment 3.

Even when a third suctioning at an even lower suction rate was further combined after the second suctioning (Experiment 2), the liquid was successfully removed in a shorter period of time than liquid removal at the reference suction rate. In addition, inclusion of the additional third suctioning in the presence of the liquid in channel 140 (Experiment 2) was found to result in further reduction of the amount of a residual liquid in channel 140.

The present application claims priority of Japanese Patent Application No. 2015-219492 filed on Nov. 9, 2015, and the contents of the claims, the specification, and the drawings of the application are incorporated herein by reference.

INDUSTRIAL APPLICABILITY

The method for removing a liquid according to the present invention can lower the likelihood of the occurrence of mixing of liquids without changing the configuration of a channel chip and without consuming an unnecessarily long time for liquid removal. In addition, the method for removing a liquid according to the present invention can shorten the time for liquid removal. Accordingly, the present invention is expected to contribute to wider use and further development of channel chips especially in the field of chemistry or biochemistry.

REFERENCE SIGNS LIST

100 chip holder
110 channel chip
112 channel chip
114 channel chip
120 substrate
130 channel lid
140 channel
145 ceiling of channel
150 through-hole
160 through-hole
170 liquid reservoir
172 membrane
200 suction instrument holder
210 pipette
220 nozzle
230 plunger
300 suction-regulating section
310 pressure valve
320 decompression section
330 controlling section
400 liquid-manipulating apparatus

The invention claimed is:

1. A method for removing a liquid in a channel of a channel chip including a through-hole provided in a ceiling of the channel and communicating with the outside by suction with a liquid suction instrument inserted into the channel via the through-hole, the method comprising:
   first suctioning including suction of a part of the liquid in the channel into the liquid suction instrument at a first suction rate; and
   second suctioning including suction of a liquid remaining in the channel into the liquid suction instrument at a second suction rate lower than the first suction rate, after the first suctioning,
   wherein the second suctioning is performed sequentially after the first suctioning, without having performed biochemical detection or measurement between the first and second suctioning.

2. The method according to claim 1, wherein the first suctioning and the second suctioning are each performed once.

3. The method according to claim 1, wherein the first suctioning is performed only when the surface of the liquid is higher in the vertical direction than the ceiling of the channel.

4. The method according to claim 1, further comprising third suctioning performed sequentially after the second suctioning and including suction of the liquid into the inside of the liquid suction instrument at a third suction rate lower than the second suction rate, wherein
   the third suctioning is performed when the surface of the liquid is within the channel.

5. The method according to claim 1, wherein the maximum value of a cross-sectional area of the channel is 5 mm² or smaller.

6. A liquid-manipulating apparatus comprising:
   a chip holder that holds a channel chip, the channel chip including a channel and a through-hole provided in a ceiling of the channel and communicating with the outside;
   a suction instrument holder that holds a liquid suction instrument to be inserted into the through-hole of the channel chip held by the chip holder and suction the liquid in the channel; and
   a suction-regulating section that controls the suction rate for the liquid into the liquid suction instrument to a first suction rate and, sequentially after suction at the first suction rate, controls the suction rate for the liquid into the liquid suction instrument to a second suction rate lower than the first suction rate wherein the suctioning at the second suctioning rate is performed sequentially after the suctioning at the first rate, without having performed biochemical detection or measurement between the suctioning at the first rate and the suctioning at the second rate.

* * * * *